United States Patent [19]

Shiao

[11] 4,017,425
[45] Apr. 12, 1977

[54] METHOD OF ACTIVATION OF RED MUD

[76] Inventor: Shing-Jen Shiao, 48-18, 2-chome, Eifuku, Suginami, Tokyo, Japan

[22] Filed: Nov. 10, 1972

[21] Appl. No.: 305,433

[52] U.S. Cl. .............................. 252/453; 252/455 R
[51] Int. Cl.$^2$ ...................... B01J 37/02; B01J 29/06
[58] Field of Search .................. 252/450, 463, 453; 208/307

[56] References Cited

UNITED STATES PATENTS

| | | | |
|---|---|---|---|
| 2,769,688 | 11/1956 | Milliken, Jr. et al. | 252/463 X |
| 3,112,279 | 11/1963 | Papée et al. | 252/463 X |
| 3,311,449 | 3/1967 | Atsukawa et al. | 423/339 |

Primary Examiner—Carl F. Dees

[57] ABSTRACT

A method for activating the red mud formed in the Bayer alumina producing process for allowing its use as adsorbent, catalyst, ion-exchanging substance and clarifying substance, comprising a digesting red mud and dispersing the metal oxide compound particles in the compound of metal hydroxides and silica gel. The method comprises digesting red mud with acid, before adjusting the pH of the acid digested mixture comprising the sludge product to above 4 to disperse oxide compound in the compound the metal hydroxides and silica gel, and removing the residue acid employed from the gelating product with washing, then with or without shaping treating, and heat treating the product to provide a active red mud, particularly with respect to the catalytic cracking, decolorization of hydrocarbon, clarification of waste gas and adsorption processes.

10 Claims, 6 Drawing Figures

METHOD OF ACTIVATION OF RED MUD

BACKGROUND OF THE INVENTION

The present invention relates to the activation of red mud formed in the Bayer alumina producing process and the utilization of activated red mud as adsorbent, catalyst, ion-exchanging substance and clarifying substance, particularly with respect to the catalytic cracking, adsorpting, decolorizing and clarifying processes.

It is well known that process for activating red mud from the Bayer process by baking an intimate mixture of red mud and of a caustic soda lye, at a temperature lower than 600° C, then crushing and lixivating the product with hot water is disclosed in U.S. Pat. No. 2,432,071. This process needs so a great amount of caustic soda and heat energy that the cost of the operation is high, though the recovery of alumina of the vanadic acid of the red mud is taken into account. The activated red mud performed by said process is employing in adsorbing $H_2S$ gas only. The mechanism of soda lye baking red mud is due to contains hydrated iron sesquioxide formed through the hydrolysis of a ferrite produced during baking.

Now I have discovered a economical wet process that is possible to make the Bayer red mud active as concerns adsorbent, catalyst, clarifying material and ion-exchanging material by submitting it to the following treatment;

Digest red mud and disperse the metal oxide compound particles in the compound of metal hydroxides and silica gel which comprises;

a. digesting the red mud with acid selected from the group consisting of $HCl$, $H_2SO_4$, $HNO_3$, $H_2SO_3$, $H_2CO_3$ and $HF$, b. adjusting the pH of the acid digested mixture comprising the sludge product to above 4 to precipitate the dissolved iron and aluminum as hydroxides along with silica gel on the surface of residual particles of red mud, c. separating the washing the gelation product, and d. heat treating the resulting active compound under 800° C;

said method being further characterized in that the product of step (c) is treated comprising the process of shape making, prior to treatment in accordance with the next succeeding step.

The chemicals needed for activating red mud of the present invention are acid what is only, practically, in need of a reaction quantity of sodium component of mud in stoichiometry, and alkali for pH adjusting. The sodium component may be recovered as salt and the alkali compound may be reused in process cyclically by treatment. So that the cost of the present invention's operation is a not unconsiderable extent and can be aply easily in industry.

The active mechanism of the product of present invention is mainly due to the porous structure what is caused by the dispersing metal oxide compound particles in the amorphous compound formed by metal hydroxides and silica gel.

To employ the mud sludge, directly, from the sedimenter of alumina producing process in wet state without any pretreatment is one of the advantages of present invention.

BRIEF SUMMARY OF INVENTION

It is an object of the present invention to provide an economical wet process for making active red mud from the Bayer process that treats the red mud with acid.

Another object of the invention is to provide an adsorbent for using the activated red mud in adsorption process.

The still object of the invention is to provide a catalyst for using the activated red mud in catalytic process.

The fourth object of the invention is to provide a clarifying material of waste gas for using the activated red mud in clarifying process.

The fifth object of the invention is to provide an ion exchanging material for using the activated red mud in ion-exchanging process.

The sixth object of the invention is to provide a base material for making adsorbent, catalyst, clarifying agent and ion-exchanging agent.

These and other object will be apparent from the drawings and the following description thereof.

DETAILED DESCRIPTION

Figure 1:
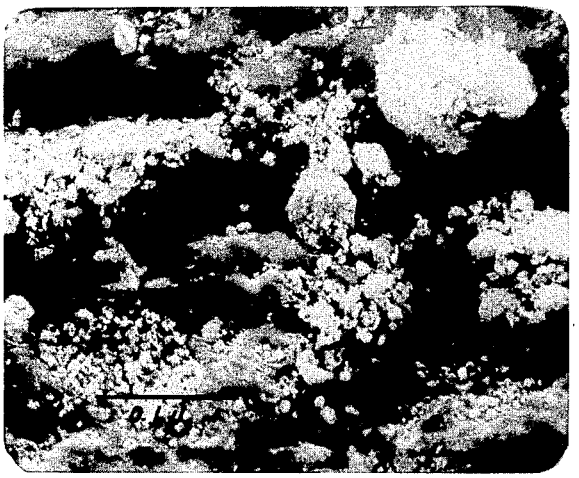
FIG. 1 is the scanning electron microphotograph of raw red mud used in the present invention.

Though the uses of red mud have been studied and suggested by many researchers for the sake of less commercial merit, there is not a reasonable and perfect method discovered for dissolving the problem of treating red mud yet.

The inventor intended to treat red mud by a wet economical method for making an active material. It is well known that the activity of clay minerals is mainly caused by micro pores they reserved. It means that the more micro pores are retained, the higher is the activity and the larger is the surface. The said micro pore may be enhanced by the method of chemical treatment. In acid treating, the adsorbed salts and exchangeable cations are dissolved first, and then the most aluminum ions and other metallic ions are removed from the lattice of structure so that many micro pores are introduced. In Bayer process, however, extracting alumina from bauxite with high concentration soda liquor most aluminum ions are dissolved out of the lattice structure of ore, forming sodium aluminate and sodalite compounds, and the positions of original aluminum ions are replaced by sodium ions mostly. Red mud, however, does not show good activity for adsorption and other processes after so many aluminum ions have been removed that is because of much excess free sodium hydroxide, adsorbed sodium ions and the insoluble compounds, so-called sodalite and sodium silicate, presenting a wall of water-glass like compound which enshrouds the red mud particles. To remove these compounds by acid treatment and to precipitate the dissolved metallic components as hydroxides along with silica gel on the surface of residual particles of red mud are the process of activation of red mud.

The inventor also discovered that to precipitate the metallic hydroxides such as $Al(OH)_3$ and $Fe(OH)_3$ by adjusting the pH of acid treated solution, comprising the sludge product retained, increases the activity of treated red mud very much. The mechanism of the increasing activity of said treated red mud is the dispersion of metal oxide compound particles in the compound of silica gel, formed by the decompositions of sodalite and sodium silicate, and metal hydroxide, formed by the precipitates of hydroxide during pH adjusting, and introduce many pores. Though the sodium compounds of red mud are decomposited and dissolved in solution, only the component of Na and other adsorbed alkali metals are dissolved in solution which metal hydroxide compounds are precipitated by pH adjusting treatment, and removed from the gel formed product by separating, filtering and washing. The sodium component may be recovered from the filtrate. The structure of the product of present invention is different from that of original red mud remarkably.

Acids can be employed in present invention are inorganic acid such as HCl, $H_2SO_4$, $HNO3$, HF, $H_3PO_4$ $H_2SO_3$, $H_2CO_3$. Inorganic acid, especially, HCl, $H_2SO_4$, $H_2SO_3$ and $HNO_3$ are reasonable in practical scale using. They can be used in single or in mixture in process. Both $H_2SO_3$ and $H_2CO_3$ may be introduced in their gas state of $SO_2$ and $CO_2$. The quantity of acid is that the mole ratio of acid, being employed, to that of sodium contained in the red mud used, is greater than 1. The concentration of treating acid has a great effect on digestion. Even at the same mole ratio of acid to sodium the thicker solution, having less volume of water, plays a stronger digesting effect than the thinner one. On account of the advantage of cconomic economic high in concentration and low in mole ratio of acid to sodium is practical, preferably at the ratio of solution weight to weight of red mud on dry base from about 3 to about 10. An unsettled agitating is necessary during digestion. Temperature above room temperature will be enough for digestion, but a higher temperature than room temperature at boiling point or so, is preferably. Heating may be done by either direct heat methd or indirect method by introducing a super-heated steam into the digestor. Apparently the latter method is practical for avoiding the over heat of red mud at digestor's bottom. The digestion finishes in a high concentration acid solution in a few minutes at boiling point, so that the energy for digesting is not much.

Three different processes are operated, illustrated in examples, for the treatment of acid digested product before washing. The first is to filter the said digested product and wash the filter cake with pure water till no anion of employed acid remained. The second is to remove a partial solution of acid digested product by filter or sedimenter, and then adjust the pH of the solid contained part in a sufficient water solution by adding alkali solution, introducing ammonia gas or the solution decompositing ammonium compounds such as $(NH_2)_2CO$; and then washing. And the third is that adjust the pH of acid digested product directly by the methods described in the second method. The Substance can be employed for pH adjusting process are $NH_3$, $NH_4OH$, $(NH_2)_2CO$, and $(NH_4)_2CO_3$. To precipitate the iron ion and aluminum ion, dissolving in solution as the product of hydroxide, is the main purpose of pH adjusting.

A value of pH above 3 will cause the precipitation of of $Al(OH)_3$ and $Fe(OH)_3$, and reaches a perfect condition of precipitation between at pH 7 and pH 8. The advantages of the precipitation of metal hydroxides are to have a porous product forming on the metal particles of red mud of no-digested that introduces a high activity of final product, to have a high efficiency of filter rate, to have a good washing rate for removing anion ion from cake and to enhance the final product to be a fine property of shape making.

To remove the residue anion ion of employed acid and other dissolved salts from cake by washing. A dilute solution of ammonium hydroxide or ammonium carbonate will increase the efficiency of washing process of cake resulted from the treatment of acid digesting only. The temperature of washing solution is preferably a warm one from about 40° to about 80° C. After dehydrating the washed cake by heat-treating under 800° C crush and sieve the product.

The quantity of precipitates during pH adjusting can be controlled by either employing varying the mole ratio of acid to that of Na in treatment or removing a part of the solution of product of acid digesting prior to the treatment of pH adjusting. The composition of metal hydroxide can be controlled by either keeping the pH above 10 where the $Al(OH)_3$ is dissolved again, or adding the hydroxides of iron or aluminum to the product of washing process.

Before filtrating the product of pH adjusting process aging the said product at a temperature above room temperature, preferably at from about 50° to about 80° C, for a period of at least 10 minutes in contact with a large quantity of mother liquid will improve the structure of gel formation very well.

The activated red mud shows a strongest active property by heat-treating at from about 430° to about 500° C, and loses its active property rapidly by heat-treating at a temperature about above 800° C. That is due to the dehydrating of boehmite at the range of from 430° to 500° C, which increases the porous manner of activated red mud; and the boehmite changes to a state of alpha-alumina what affects and decreases its active property.

In the process of contact a crushed and sieved product under 100 mesh is adapted. In a percolation process or a tower packing process, however, a product of size above 60 mesh is required. In order to improve the passage property of fluid a shaped product is necessary. Dry the washed cake, generally, to have a water containing about from 20 to 70% on wet base, and have it shaped by shape machine under a pressure above 300 kg/cm² or so in a desired sized before heat-treatment.

For the purpose of enhancing the strength of shaped add with or without a few solution of 1–5% gelatine to the washed cake before dehydrating and mix well. Granulate the mixed material into a size from about 0.1 m/m to about $3^{m/m}$ and dry further to a water containing from about 25 to about 40% on wet base. Crush a part of it and mix with the no-crushed part in a proper ratio, adding, if nsecessary, antifriction selected from the group consisting of stearic acid, aluminum stearate and magnesium stearate, and $Fe_2O_3$ and/or $Al_2O_3$; and mix well. The above mixed material is shaped in a shape machine under a pressure of above 30 kg/cm² or so in a desired sired size and heat-treated at a temperature below 800° C gradually.

Figure 2:
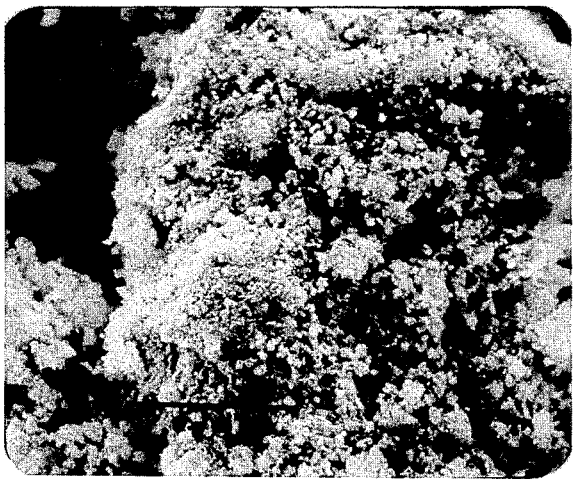
FIG. 2 is the scanning electron microphotograph of the product of ordinary acid treatment designated as "A".
Figure 3:
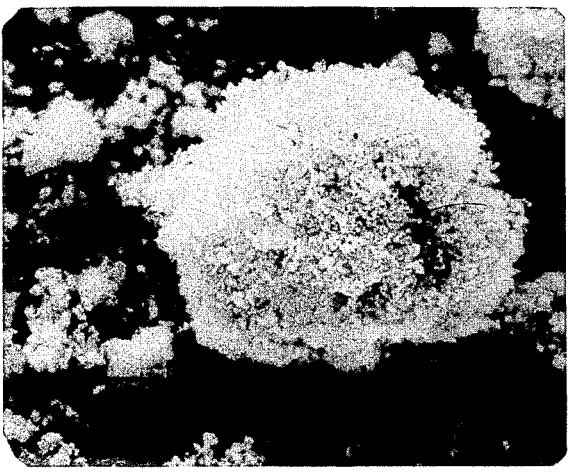
FIG. 3 is the scanning electron microphotograph of the product of present invention designated as "B".
Figure 4:
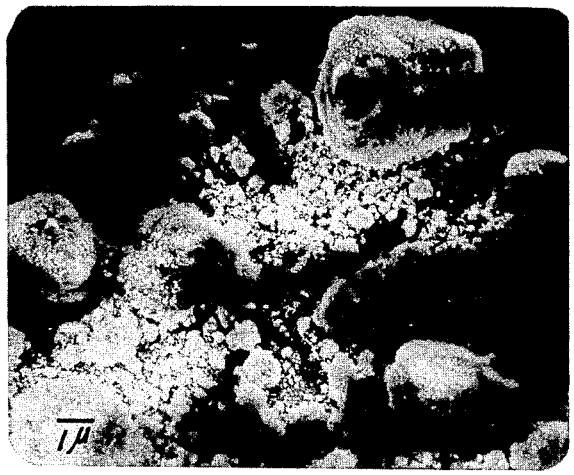
FIG. 4 is the scanning electron microphotograph of the product of present invention designed as "C".

The structures of products of present invention are compared with that of rew red mud by scanning electron microphotograph in the accompanied drawings from FIG. 1 to FIG. 4. FIG. 1 is the scanning electron microphotograph of raw red mud employed in present invention, consisting of many small individual particles which seems to be covered with a gel forming structure. The compact structure of raw red mud may be considered by the formation of water glass and sodalite compounds on particle surface that decreases the active surface. FIG. 2 is the scanning electron microphotograph of the product of present invention designated as A. The surface of A forms more porous than that of raw red mud. The porous condition is, apparently, introduced by the treatment of acid digesting removing the water glass and sodalite compounds from the surface of particle. FIG. 3 is the scanning electron microphotograph of the product designated as B that shows a very porous structure greater than that of product A. FIG. 4 is the scanning electron microphotograph of product designated as C that shows the most porous structure of all, and forms, clearly, a layer structure in cylindrical form. The porosity of product of present invention is increased in agreeing to the existence of quantity of metal hydroxides. The specific surface experimented with BET method with nitrogen gas adsorption at the boiling point of liquid nitrogen is increased obviously with increase of the formations of aluminum hydroxide and ferric hydroxide; and the order of specific surface is as following;

raw red mud < A < B < C

The specific surface of product B or C is greater than 200 m²/gr. and increases with the increase of formation of hydroxides.

The activated red mud produced by present invention has the properties of adsorption, catalystic cracking and ion-exchange. Therefore, the activated red mud is adapted for the uses of adsorpting process including decolorizing hydrocarbons, consisting of the products of petroleum, oils and fats, and water solution having a value of pH above 2; for the uses of clarfying process including removing the sulfur compounds and other hazardous compounds from gaseous stream; for the use of catalytic cracking process including the cracking of hydrocarbon; and for the use of ion-exchanging process including cation ion-exchange.

The invention will be understood more readily by reference to the following examples; however, these examples are intended to illustrate the invention and are not to be construed to limit the scope of the invention.

EXAMPLE

The composition of red mud used in the following instances is;

Ing. loss 12%, $SiO_2$ 11%, $Al_2O_3$ 25%, $Fe_2O_3$ 38%, $Na_2O$ 9%, $TiO_2$ 3%, on dried at 110° C base.

1. Mixed 500 grams of 85 weight percent water contained red mud sludge and 60 grams of 35% HCl solution in flask, stirring and heating at its boiling point for an hour. Separated the acid digested product by filter and washed the cake with warm water until no chlorine ion can be detected from the washing filtrate with nitrate silver solution. Dried the clean cake at 110° C in oven for 4 hours. Crushed and sieved the dried product between 20 mesh and 50 mesh, and under 100 mesh. Heated at 400° C for 2 hours and designated the product as A.

2. Mixed 100 grams of 80 weight percent water contained red mud sludge and 4.8 grams of 95% $H_2SO_4$ in flask, stirred and heated at boiling point for 40 minutes. Separated the acid digested product by filter and washed the cake with warm water until no sulfuric ion can be detected in the washing filtrate with barium chloride solution. Dried the clean cake at 110° C. Crushed and sieved the dried product from 20 mesh to 50 mesh and under 100 mesh. Heat treated at 450° C for 1.5 hours and designated the product as "A1".

3. Clean cake gained by the process described in the last example was dried and heated at 450° C for 2 hours. Crushed and sieved the heat treated between 20 mesh and 50 mesh, and 100 mesh under; and designated the product as "A2".

4. Removed the mineral particles, sand and impurities of the red mud by liquid sieving, passing red mud sludge through a 100 mesh sieve, and refined it with liquid cyclon. Adjusted the refined sludge to be containing 85% of water. Mixed 500 grams of above sludge and 60 grams of 35% HCL solution, and stirred at its boiling point for 1 hour. Filtered and then washed the cake with 0.2N $NH_4OH$ solution until no chlorine ion can be detected in the washing filtrate, and with water finally. Dried the cake at 120° C. Crushed and sieved the dried matter under 100 mesh; the product designated as B.

5. Refined the 95% water contained red mud sludge to remove impurity by passing it through a 200 mesh sieve. Mixed 600 grams of refined sludge with 50 grams of 35% HCl solution in flask and agitated the flask at boiling point for 20 minutes. Now diluted the contents of the flask to four times of its volume with water, adjusted the pH of solution to 8.0 with 1.0% ammonium hydroxide solution in agitating and heated for 10 minutes for aging. Filtered the product and washed the cake until no chlorine ion to be detected in the wash filtrate. Dried the clean cake at 100° C, crushed and sieved it under 100 mesh. Heated the product at 500° C for 2 hour and designated as product C.

6. Adjust the pH of solution, following the process as described in example 5, to about 8.5 by introducing ammonia gas instead of adding ammonium hydroxide solution and heated to boil for a while. Then filtered and washed the cake with warm water until no chlorine ion to be detected in the washing filtrate. Dried and heated at 450° C for 2 hours; crushed and sieved under 100 mesh, finally, and designated the product as "C1".

7. Clean cake, gained by the treatment as described in example 5, was dried to a state of 40% water contained on wet base. After grinding and mixing well, the material was introduced in the model of shape machine and shaped to have a size of 10$^{m/m}$ in hight, 4$^{m/m}$ in inner diameter and 10$^{m/m}$ in outer diameter under a pressure of 250 kg/cm², and heat-treated slowly at 400° C for 2 hours. The product was designated as "C2".

8. Added 10 grams of 20% gel solution to the clean cake produced by the process described in example 5 and mixed well. Dried to a state of containing 50% water on wet base, then grinded and mixed. Granulated the mixed material to a size of about 1$^{m/m}$ with granulating machine and dried to a state of containing 25% water on wet base. crushed 10 grams of above granulated material and mixed with the residue and 0.5 gram of stearic acid. Shaped the mixed material the model of shape machine to a size of $10^{m/m}$ in outer diameter, $4^{m/m}$ in inner diameter and $10^{m/m}$ in hight, and heat-treated slowly at 350° C for 2 hours. The product is designated as "D".

9. This is a comparison of decolorizing efficiency of the product of A, B and C of present invention with commercial activated clay, 200 mesh under, and commercial acid clay, 200 mesh under. The colored testing solution was prepared by dissolving 4 grams of commercial asphalt in commercial kerosene and filtered twice. Charged, exactly, 30 ml of asphalt kerosene solution into each centrifugal tube and added 1wt.%, 2wt.%, 3wt.%, 5wt.%, 7wt.% and 9wt.% of products A, B and C, activated clay and acid clay in ratio to the solution, respectively.

Figure 5:
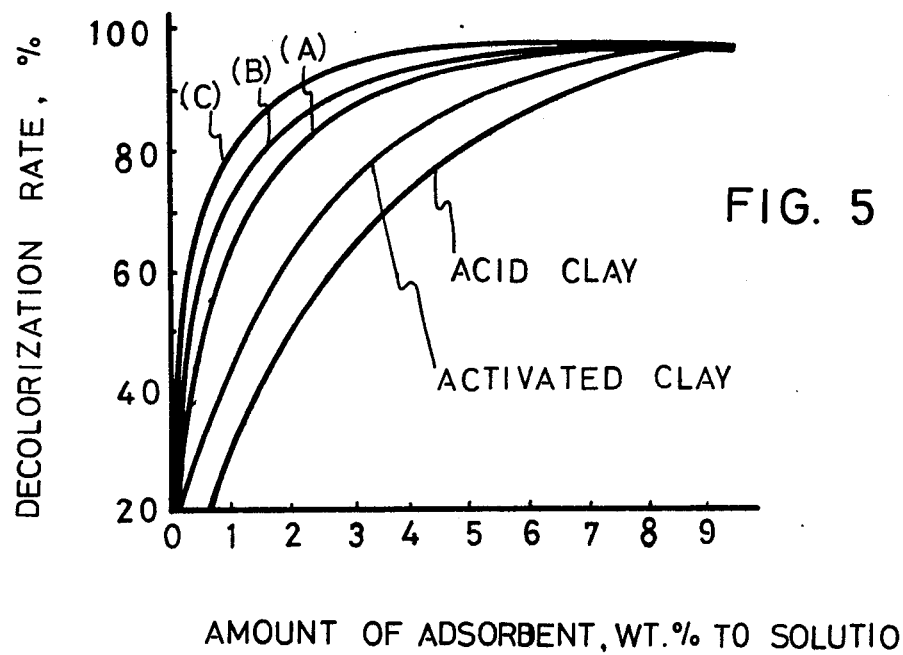
FIG. 5 is a comparison of decolorization efficiency of the products of present invention designed as A, B and C with the commercial activated clay and acid clay in contact with asphalt-kerosen solution at constant time.

The contact decolorizing reactions were carried out by shaker moving 100 times per minute at room temperature for 30 minutes. Separated the solid by centrifuge and examined the transmittancy by photometer in referring to kerosene and calculated the efficiency of decolorization. The results is shown in FIG. 5.

Evidently, activated red muds are superior to acid clay at all range and superior to activated clay at low addition of adsorbent, under 6 wt. % to solution. For example, to remove 90% of asphalt from the solution at the same contact conditions needed 1.7 wt. % of activated red mud, while 3.4 wt % of activated clay or 5.6 wt. % of acid clay was needed.

Figure 6:
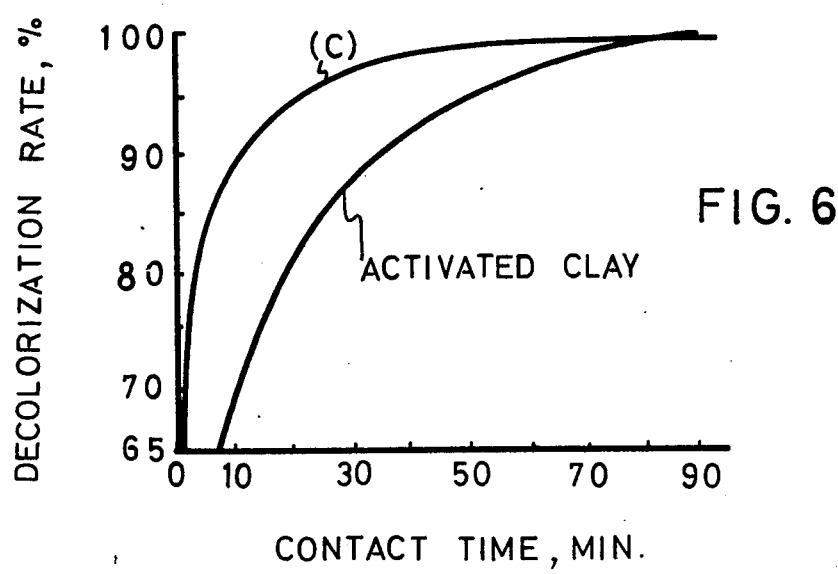
FIG. 6 is a comparison of decolorization efficiency of the product of present invention designed as C with commercial activated clay in contact with asphalt-kerosene solution at constant amount of adsorbent addition.

10. Treatments and the colored solution were the same described in example 9 excepting varying the contact time, adding 3 wt. % of adsorbent in all runs and testing the product C and commercial activated clay only. The results are shown in FIG. 6.

Adsorpting 95% of asphalt from colored solution, for instance, activated red mud was needed only 20 minutes, and 65 minutes for commercial activated clay. The most remarkable characteristic of activated mud is that the equilibrium established very quickly than others.

11. Contact decolorization of furance oil (class A ) with 5 wt. % adsorbent of product A, B and C, raw red mud, clay under 300 mesh, activated clay and active carbon were carried out to contact 50 minutes; and decolorizing efficiency examined as the method described in example 9. Diluted the dark solutions with kerosene before photometric analysis.

The decolorization efficiencies were calculated and listed as following table:

| Adsorbent | | Decolorizing Efficiency (%) |
|---|---|---|
| product of present invention | "A" | 60.0 |
| " | "B" | 65.5 |
| " | "C" | 70.0 |
| raw red mud | | 16.5 |
| activated clay | | 50.0 |
| clay under 300 mesh | | 22.5 |
| active carbn | | 65.5 |

It is clear that the product of present invention shows the strongest decolorizing efficiency among the adsorbents.

12. Thermal cracking of residue oil by carrying the 2.34% sulfur contained residue oil passing through a $5^{m/m}$ in inner diameter pyrex glass column, packing 1.4 grams of the product of present invention size from 20 mesh to 50 mesh, at 400° C at a space velocity of 1.2. The cracked product was sampled at different time intervals and analysed the sulfur containing by quartztube combustion method (JIS K2541). Some of samples were pretreated with 4 N NaOH solution before analysis. The results are shown in following table:

| | filtrate without treat. | | filtrate treat. with 4 N NaOH solution | |
|---|---|---|---|---|
| time interval of sample (hr.) | sulfur content (%) | desulfurizing rate (%) | sulfur content (%) | desulfurizing rate (%) |
| charge oil | 2.34 | | | |
| 0–0.5 | 1.015 | 56.5 | 1.01 | 56.8 |
| 0.5–1.5 | 1.43 | 39.5 | 1.43 | 39.5 |
| 1.5–7.0 | 2.30 | 1.72 | 1.75 | 25.2 |

A distinguished desulfurizing efficiency resulted in using activated red mud for the cracking desulfurization of residue oil.

13. Connected a 100 ml. volume of gas storage and a 20 ml. volume of sample tube with a valve, and led both to a vacuum system. A large enough pool of Hg storage was connected to the gas storage for adjusting the pressure of gas. Set about 1 gram of sample, the product of present invention, in sample tube and made it to a pressure of 1 mm Hg high. Introduced $SO_2$ gas to the gas storage and let the gas to contact with the sample by adjusting the Hg storage to keep the pressure of sample tube always as high as that of atmorspher until the adsorption was reached equilibrium. The decreased volume of $V^{c.c}$ was mearsured and the quanity of $SO_2$ adsorbed was calculated by following equation:

$$\text{Adsorbed } SO_2 \text{ (g.}SO_2/\text{ g. adsorbent)} = \frac{V \times 64}{22.414 \times W}$$

where 64 is the molecular weight of sulfur dioxide and W the weight of sample. The results are listed in the following table:

gram of sulfur dioxide adsorbed by per gram of adsorbent.

| Measurement | 1 | 2 | 3 | 4 | average |
|---|---|---|---|---|---|
| Product of present invention | 0.26 | 0.25 | 0.24 | 0.27 | 0.255 |
| Active alumina | 0.18 | 0.17 | 0.19 | 0.18 | 0.18 |

The efficiency of activated red mud is greater than that of active alumina. The adsorpting reaction of sulfur dioxide of active alumina is an irreversible one. The activated red mud, however, adsorbs sulfur dioxide gas and can be revivified by the treatments of water washing and drying easily. The desulfurization of sulfur compounds contened gas may be dissolved by employing activated red mud economically.

14. Contact decolorization of sesame oil by the method as described in example 9 was carried out. Where the addition of adsorbent was 2 wt. percent to the oil. The product was improved better in using activated red mud than in using commercial activated clay.

The ability of ion-exchange of the product of present invention was measured and had a value of greater than 1 m.eq./gr.

As this invention may be embodied in several forms without departing from the spirit of essential characteristics thereof, the present embodiment is therefore illustrative and not restrictive, since the scope of the invention is defined by the apended claims rather than by the description preceding them, and all changes that fall within meets and bounds of the claims, or equivalence of such meets and bounds are therefore intended to embraced by the claims.

What I claim is:

1. Activated red mud for allowing its use as adsorbent, catalyst, clarifying substance and ion-exchanging substance is made from red mud of Bayer process by method comprising digesting red mud and dispersing the metal oxide compound particales in the compound of metal hydroxides and silica gel which comprises;
   a. digesting the red mud with acid,
   b. adjusting the pH of the acid digested mixture comprising the sludge product to above 4,
   c. separating and washing the gelation product, and,
   d. heat treating the resulting active compound under 800° C.

2. The method of claim 1 further charaterized with respect to step (a) the quantity of the said acid selected from the group consisting of $HCl$, $H_2SO_4$, $H_2SO_3$, $HNO_3$, $HF$ and $H_2CO_3$, is that the mole ratio of acid, being used, to sodium contained in red mud is greater than 1.

3. The method of claim 2 further characterized with respsct to step (a) in that said digesting is carried out at a temperature above room temperature, preferably at about its boiling point under a good agitating condition for a period assuring the digestion is complete.

4. The method of claim 3 further characterized with respect to step (b) in that said pH adjusting comprising neutralizing the acid digested mixture with ammonium ion contained solution selected from the group consisting of $NH_3$, $NH_4OH$, $(NH_4)_2CO_3$ and the decomposition of $(NH_2)_2CO$ by heating, to a value above 4.

5. The method of claim 4 further characterized with respect to step (b) in that said pH adjusting hereafter, aging the same at a temperature above room temperature, preferably at from about 50° to about 80° C for a period of at least 10 minutes.

6. The method of claim 5 further characterized with respect to step (c) in that said washing comprising washing the cake with water, preferably with warm water, to remove the residue anion of employed acid.

7. The method of claim 6 further characterized with respect to step (d) in that said heat treated product of hereabove process is crushed and sieved.

8. The method of claim 3 further characterized in that the product of step (a) is treated, prior to treatment in accordance with step (b), to remove a part of the solution.

9. The method of claim 6 further characterized in that the product of step (c) is treated, prior to treatment in accordance with step (d), in order to shape to a desired size at a pressure of above 300 kg/cm$^2$ or so by introducing into the model of shape machine, drying to a degree of water containing from about 20 to about 70% by weight on wet base first and then grinding and mixing.

10. The method of claim 6 further characterized in that the product of step (c) is treated, prior to treatment in accordance with step (d), in order to shape to a desired size at a pressure of under 300 kg/cm$^2$ by introducing into the model of shape machine by the method which comprises before drying to a degree of water containing from about 45 to about 70% on wet base, adding with or without 1–5% gelatine solution first, the product which is mixed and granulated in a size of from about 0.1$^{m/m}$ to about 3$^{m/m}$, further drying to a degree of water containing from about 25 to about 40% on wet base and crushing a part of it, and mixing the crushed material with the no-crushed one in a proper ratio, and with a proper amount of antifriction selected from the group consisting of stearic acid, magnesium stearate and aluminum stearate; and iron oxide and alumina.

* * * * *